US007580942B2

(12) United States Patent  (10) Patent No.: US 7,580,942 B2
Yu et al.  (45) Date of Patent: Aug. 25, 2009

(54) INDEXING AND RANKING PROCESSES FOR DIRECTORY ASSISTANCE SERVICES

(75) Inventors: Dong Yu, Kirkland, WA (US);
Alejandro Acero, Bellevue, WA (US);
Yun-Cheng Ju, Bellevue, WA (US);
Ye-Yi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 11/652,733

(22) Filed: Jan. 12, 2007

(65) Prior Publication Data

US 2008/0172376 A1  Jul. 17, 2008

(51) Int. Cl.
*G06F 17/30* (2006.01)
(52) U.S. Cl. .............................. 707/101; 707/3; 707/5; 707/10
(58) Field of Classification Search .................. 707/3, 707/4, 5, 6, 10, 101, 102
See application file for complete search history.

(56) References Cited

U.S. PATENT DOCUMENTS

| | | | |
|---|---|---|---|
| 5,987,408 A * | 11/1999 | Gupta .......................... 704/231 |
| 6,609,121 B1 * | 8/2003 | Ambrosini et al. ............. 707/3 |
| 6,732,160 B2 * | 5/2004 | Ambrosini et al. .......... 709/218 |
| 6,996,531 B2 * | 2/2006 | Korall et al. ................. 704/270 |
| 7,072,643 B2 * | 7/2006 | Pines et al. .............. 455/414.1 |
| 7,266,775 B2 * | 9/2007 | Patitucci ..................... 715/735 |
| 7,403,942 B1 * | 7/2008 | Bayliss .......................... 707/5 |
| 2002/0143548 A1 * | 10/2002 | Korall et al. ................. 704/270 |
| 2003/0191757 A1 * | 10/2003 | Ambrosini et al. ............. 707/3 |

* cited by examiner

*Primary Examiner*—Jean M Corrielus
(74) *Attorney, Agent, or Firm*—Westman, Champlin & Kelly, P.A.

(57) ABSTRACT

A computer-implemented method is disclosed for providing a directory assistance service. The method includes generating an indexing file that is a representation of information associated with a collection of listings stored in an index. The indexing file is utilized as a basis for ranking listings in an index based on the strength of association with a query. Based at least in part on the ranking, an output is provided and is indicative of listings in the index that are likely correspond to the query. At least one particular listing in the index is excluded from the output without there ever being a comparison of features in the query with features in the one particular listing.

13 Claims, 5 Drawing Sheets

INDEXING AND RANKING PROCESSES FOR DIRECTORY ASSISTANCE SERVICES

BACKGROUND

Directory assistance (DA) services, sometimes referred to as 411 services, enable users to find out the phone number associated with a business or residential listing. Currently, DA services are becoming increasingly popular. A typical automatic DA system includes a recognition component configured to determine a query based on input from a user. The system then produces a ranked set of listings that correspond to the query.

To accurately search for a listing, it is often helpful to incorporate as much information as possible into the analysis of determining the contents of the ranked set of listings. For example, a DA system wherein the recognition component is a speech recognizer might be configured to determine the ranked set based on information other than simply just a recognized utterance. Examples of other types of information that might be accounted for include listing categories and static ranking. Regardless of which multiple parameters are accounted for, to produce the ranked set of listings, many systems will calculate some form of a combined score for a large set of potentially matching listings.

Some recognition-based (e.g., as opposed to text-based) DA services are configured to collect multiple items of information from the user. For example, some systems will conduct several dialog turns to ask for city names, listing names, and sometimes disambiguation. The DA system searches for matching listings based on recognized text. It is possible that the user input, as recognized, may contain errors. For at least this reason, a specialized searching and ranking algorithm configured to account for the possibility of errors is utilized. Typical searching algorithms include TF*IDF (term frequency-inverse document frequency) and MaxEnt (maximum entropy). Regardless of the algorithm utilized, the scoring can typically be converted to:

$$s(l_i \mid f_j(l_i, u)) = \sum_j \lambda_{i,j} f_j(l_i, u) \qquad (1)$$

Here, $\lambda_{i,j}$ are non-negative scores and $f_j$ are features, for example, common words in the utterance and the listing, category of the listing, estimated category from the utterance, and the static score of the listing. New features can be added when available. It should be noted that $l_i$ can be a listing or something else (e.g., a category) if the user's utterance does not contain enough information for a listing.

In accordance with equation (1), to search for a correct listing, a system generally must calculate a score for each listing $l_i$. One or more (e.g., the top N) of the highest scoring listings are selected as being the most likely accurate search result or results. It would be desirable to implement an alternative algorithm that would enable a system to rank potentially matching listings in a more efficient manner.

The discussion above is merely provided for general background information and is not intended for use as an aid in determining the scope of the claimed subject matter.

SUMMARY

A computer-implemented method is disclosed for providing a directory assistance service. The method includes generating an indexing file that is a representation of information associated with a collection of listings stored in an index. The indexing file is utilized as a basis for ranking listings in an index based on the strength of association with a query. Based at least in part on the ranking, an output is provided and is indicative of listings in the index that are likely correspond to the query. At least one particular listing in the index is excluded from the output without there ever being a comparison of features in the query with features in the one particular listing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
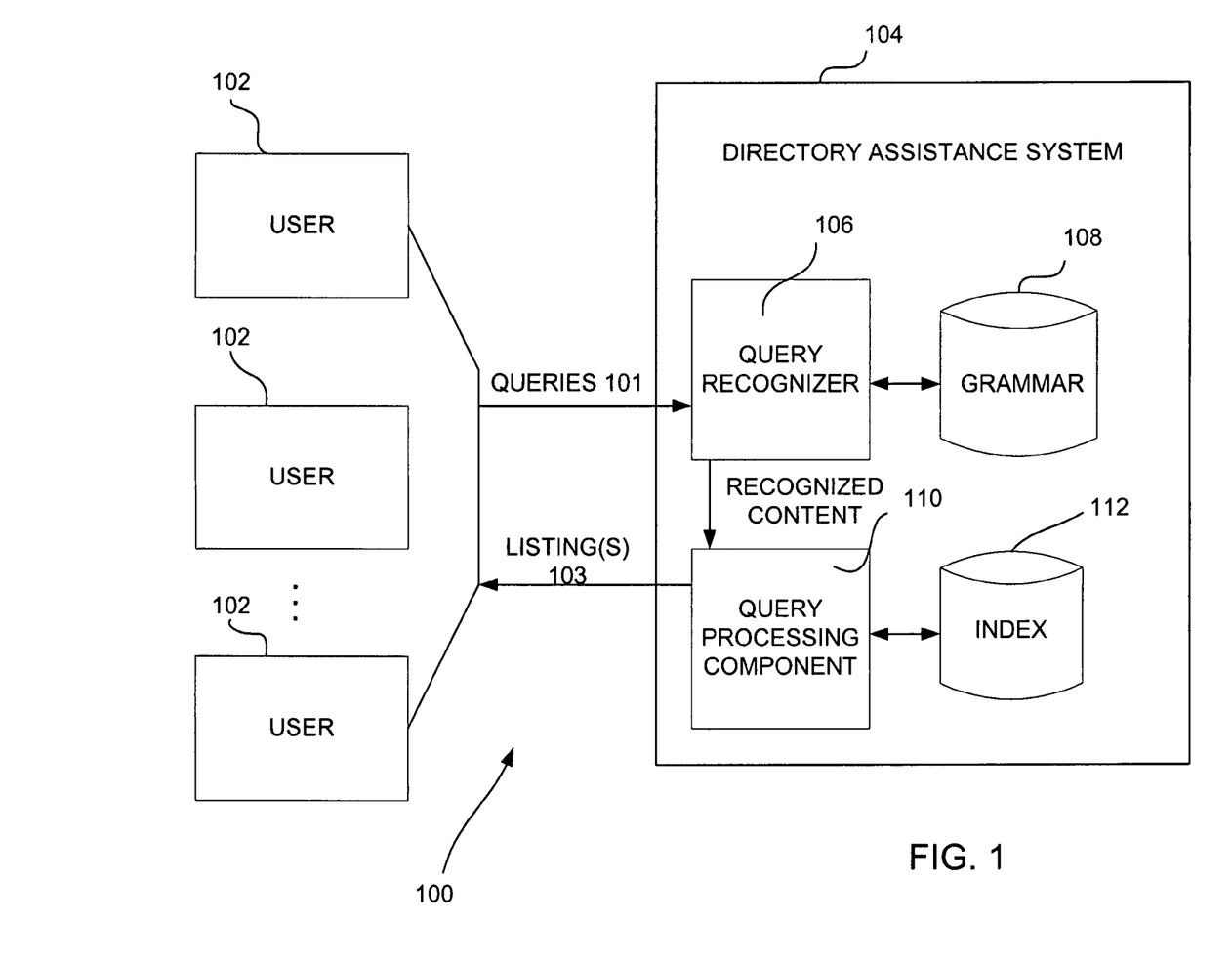
FIG. 1 is schematic diagram of a directory assistance (DA) environment.

Environment 100 includes a plurality of users 102 (an illustrative three are shown) that interact with a DA system 104. More specifically, users 102 submit queries 101 to system 104. System 104 processes the queries so as to produce one or more listings 103, which are returned to the user that made the corresponding request. The precise content of queries 101 and listings 103 is not critical to the present invention. That being said, in one embodiment, a query 101 is the name of a person or business, and a corresponding listing 103 is a phone number, an address, an email address or some other identifier along those lines.

Directory assistance system 104 includes a query recognizer 106 configured to process a query 101 by applying a grammar 108 so as to identify the content of the query. In one embodiment, not by limitation, query recognizer 106 is a speech recognition engine configured to apply a speech recognition grammar 108 so as to recognize the content of a query 101, which is an utterance spoken by a user 102. In another embodiment, query recognizer 106 is a handwriting recognition engine configured to apply a collection of handwriting characteristics 108 so as to recognize the content of a query 101, which is handwriting input by a user 102. In yet another embodiment, query recognizer 106 is a text recognition engine configured to apply a collection of text recognition characteristics 108 so as to recognize the content of a query 101, which is illustratively text input by a user 102. While the present invention is not limited to any particular method of recognition, solely for the purposes of illustrating embodiment of the present invention, it will be assumed that queries 101 are spoken, that query recognizer 106 is a speech recognition engine, and that grammar 108 is a speech recognition grammar.

The recognized content of a query 101 is provided to a query processing component 110. Component 110 is illustratively configured to compare the recognized content against an index of listings 112. In this manner, component 110 identifies, from the index, one or more listings that match (or sufficiently surpass a pre-established threshold of similarity) the recognized content of the query. This matching listing or listings (i.e., listings 103) are provided to the user that initiated the corresponding query 101.

Assuming DA system 104 is a typical DA system, the algorithm for identifying which listings in index 112 should be provided to the querying user 102 is not particularly efficient. Embodiments of methods for avoiding such inefficiency will now be discussed.

Figure 2:
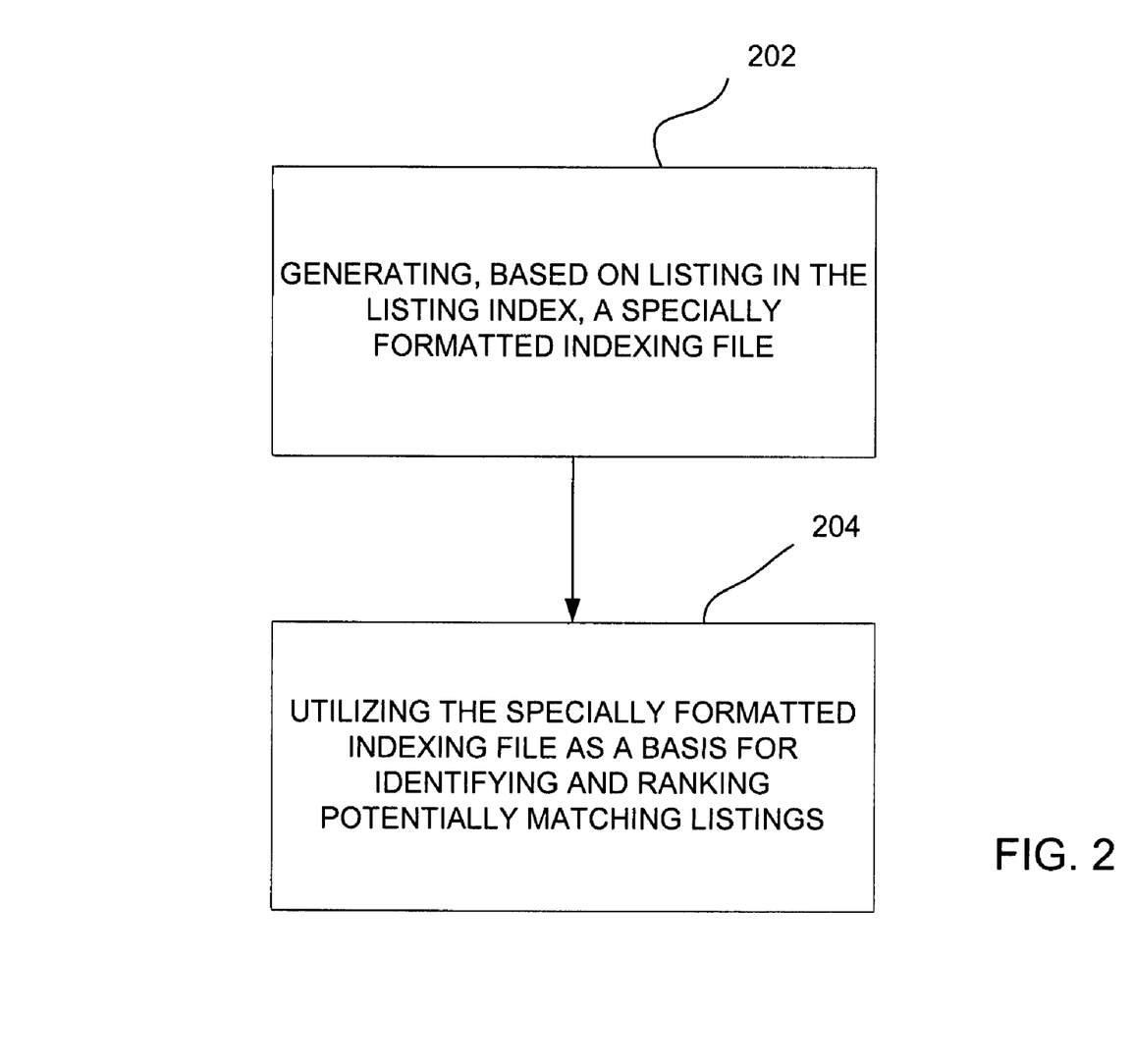
FIG. 2 is a flow chart demonstrating steps associated with identifying and raking potentially matching listings.

FIG. 2 is a flow chart demonstrating, on a high level, steps associated with identifying and ranking potentially matching listings. In accordance with step 202, a specially formatted indexing file is generated based on the listings in index 112. Then, in accordance with block 204, the specially formatted indexing file is utilized as a basis for identifying and ranking potentially matching listings.

Figure 3:
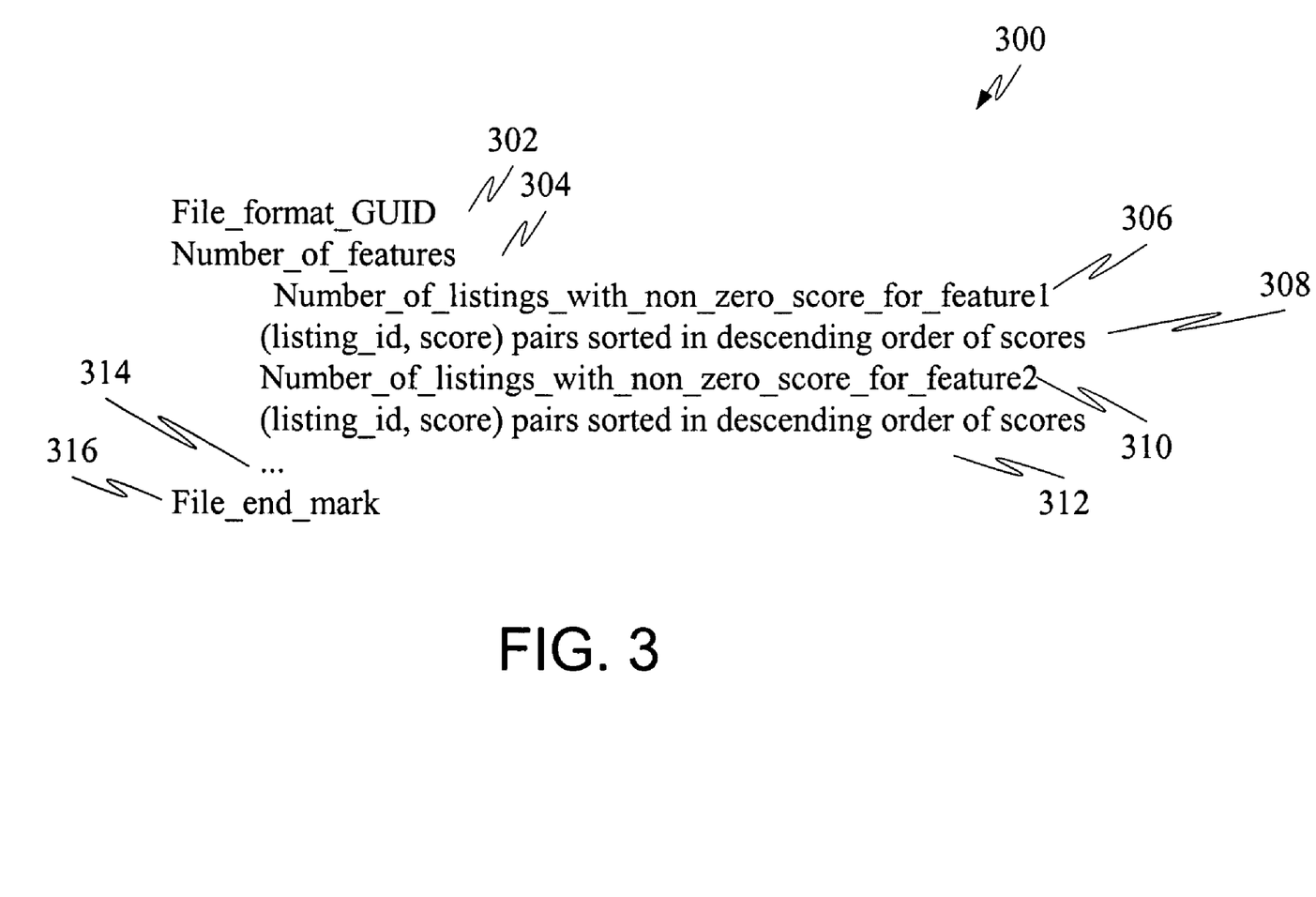
FIG. 3 is a schematic representation of one embodiment of a specially formatted indexing file.

FIG. 3 is a schematic representation of one embodiment 300 of the specially formatted index file. Those skilled in the art will appreciate that the scope of the present invention is not limited to the precise elements shown in FIG. 3. The Figure represents but one working example to which, depending on a given implementation, modifications may be made.

File 300 includes a file identifier 302. In addition to serving as a point of reference, identifier 302 illustratively identifies the type of file that file 300 happens to be.

File 300 also includes a total number of features included in indexing file 300. In one embodiment, the number entry 304 is equal to the total number of features embodied by all listings in index 112 (FIG. 1). It should be noted that the nature of what a feature is may vary from one implementation to the next. Examples of features include, but certainly are not limited to, a static ranking characteristic, one or more words, one or more categories (e.g., a function of an utterance and/or a listing), etc.

As is indicated by designation 306, file 300 also includes a total number of listings in an index (e.g., index 112) that have a non-zero score relative to a first feature identified as "feature1." As is indicated by designation 308, for each listing with a non-zero score relative to feature1, a listing identifier is presented along with the applicable non-zero score. Each listing identifier is illustratively indicative of the associated listing in index 112. The pairs of listing identifiers and associated scores are presented in descending order based on score.

As is indicated by designation 310, file 300 also includes a total number of listings in an index (e.g., index 112) that have a non-zero score relative to a second feature identified as "feature2." As is indicated by designation 312, for each listing with a non-zero score relative to feature2, a listing identifier is presented along with the applicable non-zero score. Each listing identifier is illustratively indicative of the associated listing in index 112. The pairs of listing identifiers and associated scores are presented in descending order based on score.

As is indicated by ellipses 314, file 300 contains a similar listing for each feature included in index 112. Designation 316 represents a mark indicative of the end of file 300. It should again be emphasized that file 300 is but one example of an indexing file that supports, in a manner that will be described below, a process for identifying and ranking potentially matching listings without applying a searching algorithm to every listing individually.

Indexing file 300 illustratively has a few characteristics that are worth emphasizing. First, features included in index 112 are illustratively encoded using integers sorted in an ascending and continuous order (e.g., feature 1=000, feature 2=001, feature 3=002, etc.). Second, the scores for each feature are sorted in descending order (i.e., the pairs of listing ID and associated score are sorted in descending order based on score). Finally, if a score associated with a listing for a particular feature is zero (scores are illustratively, though not necessarily, non-negative), then that listing is not stored for that feature. Those skilled in the art will appreciate that these characteristics of indexing file 300 are exemplary only and may vary depending on implementation details.

Figure 4:
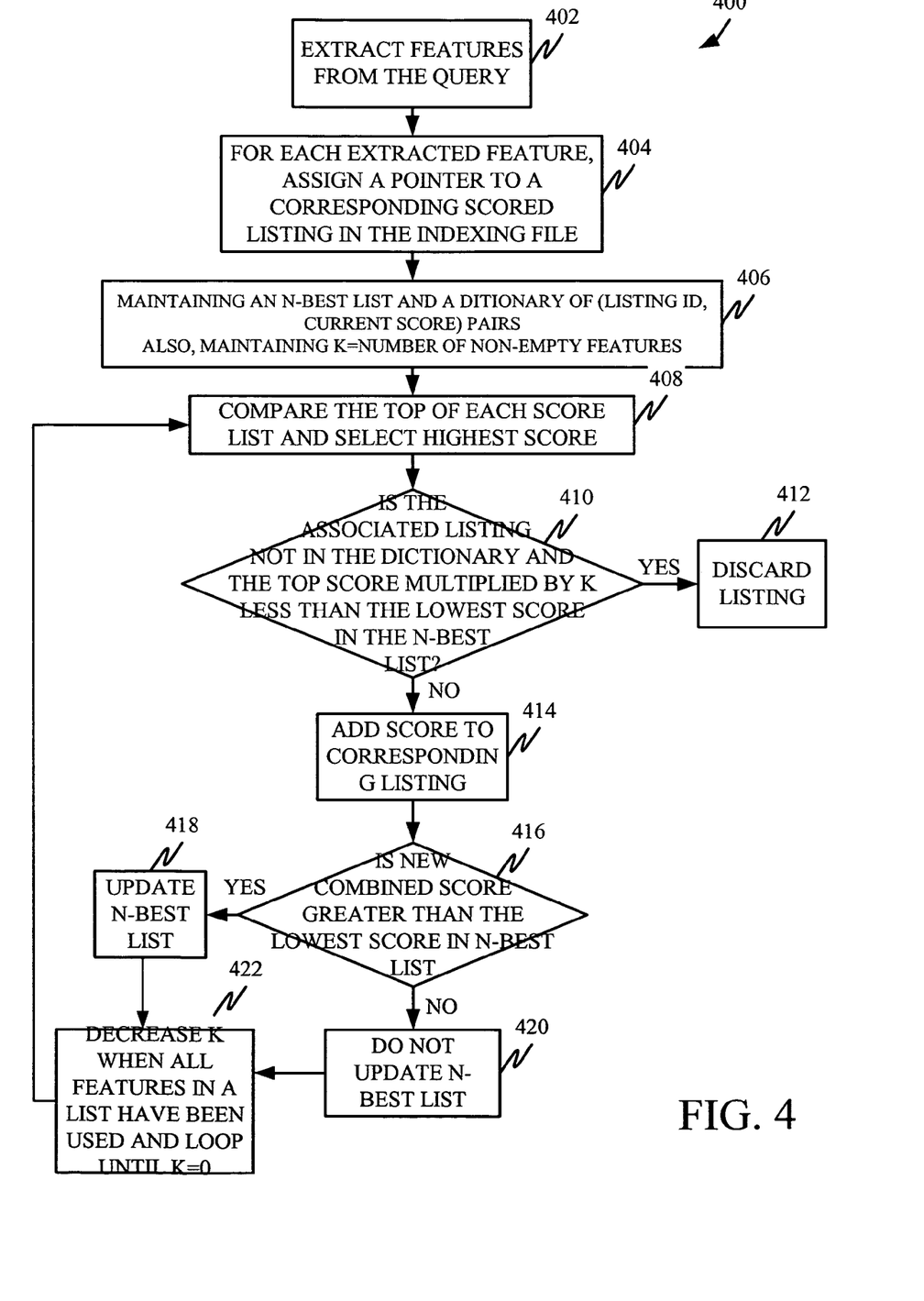
FIG. 4 is a flow chart diagram illustrating steps associated with one embodiment of a process for utilizing an indexing file to rank listings in index.

FIG. 4 is a flow chart diagram illustrating steps associated with one embodiment of a process 400 for utilizing indexing file 300 to efficiently rank listings in index 112 relative to a particular query made by a user 102 (or relative to the recognized content of the query). Those skilled in the art will appreciate that the scope of the present invention is not limited to the particular steps or order of steps shown in FIG. 4. The Figure represents but one working example to which, depending on a given implementation, modifications may be made.

In accordance with step 402, features are extracted from the query (or from the recognized content of the query). For each feature, a feature identifier is obtained. The identifiers need not necessarily be sorted in any particular order. For purposes that will become apparent, it will be assumed that L is the number of features in the query.

In accordance with block 404, for each of the L extracted features, a pointer is assigned. The pointer points, for the relevant feature, to the associated descending pairs of listing identifiers and related scores. Given that the score lists for the various features are indexed by feature identifier, this step amounts to little more than a simple array index loop up operation.

In accordance with block 406, an N best list is maintained, which is a sorted list based on score. Initially, this list is empty. Also maintained is a dictionary of listing ID's with their current score (i.e., the sum of all scores considered for that listing). Finally, a value K is maintained and represents the number of non-empty features. Initially, K is equal to L. The purpose of maintaining these items will become apparent.

In accordance with block 408, the top of each score list is examined to determine the highest score. In accordance with block 410, a determination is made as to whether the associated listing is not in the dictionary, and whether the top score multiplied by K is less than the lowest score in the N best list. If the determination is yes, then, in accordance with block 412, the listing is discarded (i.e., no change is made). Otherwise, in accordance with block 414, the score is added to the corresponding listing and, in accordance with block 416, a determination is made as to whether the new combined score is higher than the lowest score in the N best list. If no, then, in accordance with block 420, the N best list is not updated. If yes, in accordance with block 418, the N best list is updated. If all the scores in a feature list have been used, then K=K−1. In accordance with block 422, the loop is continued until K=0.

In one embodiment, there is a way to stop the score calculation earlier. In this embodiment, a variable is maintained to indicate the smallest differences between items in the N best list. If that value multiplied times K becomes higher than the top score in all the features lists, then the calculation process can be stopped as all future scores won't change the order of the N best list. One issue with this approach is that although the order of the N best list will be the same, the associated score may not be the same. Further, it is worth at least pointing out that maintaining the value indicative of the difference requires extra computation that could possibly be higher than the computation saved.

In order to better clarify the operation of process 400, an example will now be provided. For the purposes of the example, it will be assumed that index 112 contains 100 business listings. The listing identifiers are from 1 to 100 (e.g., the first listing is 1, the second is 2, etc.). It will be assumed that the system is configured to use only a static ranking feature and a unigram feature. It will also be assumed that the total number of features is 31.

To continue the example, the listing ID (lid) for "Ficus Corporation" (FC) is illustratively 5, and for "Ficus Alumni Association" (FAA) it is 9. The feature ID (fid) for the static ranking is 1, for the unigram "Ficus" is 8, for the unigram "Corporation" is 19, for the unigram "Alumni" is 23, and for the unigram "Association" is 4. Accordingly, the indexing file 300 would look something like:

```
//index_file_guid - A unique id for the index file - if
this id is incorrect, it is known that the file is either
corrputed or of the wrong type
Index_file_guid (e.g., 6 bytes)
//number_of_features - indication of the total number of
features - each feature having an entry in the file
31
//number_of_listings_with_non_zero_score_for_feature_001
100
//list the 100 listing id and score pairs for feature 1
(static ranking feature) in descending order of the score
(i.e., s1>s2, etc.) - All scores greater than 0
(7, 1.1) (17, 0.9) (5, 0.9) (9, 0.8)...
//note 5=FC, and 9=FAA
...//the same is done for features 2 and 3
4 //number of listings for feature 4 which is unigram
    "association"
(9,0.3) (15, 0.2) (29, 0,1)...
//note 9=FAA, and FC (5) is not listed for this feature
...//same for features 5 to 7
3 //number of listings for feature 8 which is unigram
    "Ficus"
(5, 1) (9, 0.8) (12, 0.7)
//note 5=FC, and 9=FAA both have this feature
...//same for features 9 to 18
13//number of listings for feature 19 which is unigram
    "Corporation"
(5, 0.2) (13, 0.2) (16, 0.1)...
//note 5=FC and FAA(9) is not listed for this feature
---//same for features 20 to 22
8 //number of listings for feature 23 which is the unigram
    "Alumni"
(41, 0.4) (9, 0.3) (56, 0.2)...
//note 9=FAA and FC(5) is not listed for this feature
...//same for all other features
```

In one embodiment, when loading this indexing file, the feature list is stored in an array F[number_of_features] with an index that is the feature ID (fid).

To continue the example, an utterance is received from a user 102 and is recognized as "Ficus Alumni Association." First, feature ID's are extracted. The static ranking feature (fid=1), unigrams "Ficus" (fid=8), "Alumni" (fid=23), and "Association" (fid=4).

Next, pointers are constructed. For example:

P1→F[1]: (7,1.1) (17,0.9) (5,0.9) (9,0.8) . . .

P2→F[8]: (5, 1.0) (9, 0.8) (12, 0.7)

P3→F[23]: (41, 0.4) (9, 0.3) (56, 0.2) . . .

P4→F[4]: (9, 0.3) (15, 0.2) (29, 0.1) . . .

Next, several informational items are maintained. One of these items is a sorted list (based on score) called NBest. For the present example, it will be assumed that only the 2 best results are desired, so N=2. Another maintained item is a dictionary (e.g., a table or a sorted list based on the lid) of (lid, current_score) pairs. This dictionary is illustratively referred to as CurScores. The integer K is set to 4 (number of features with at least one non-examined (lid, score) pair.

Next, a looped checking process is begun. The top of each (lid, score) list is compared and that with the highest score is selected. In one embodiment, this is done using a sorted list whose elements are the top pair of each list. In a first iteration, P1 contains the highest score. Since it is not in CurScores, a check is performed to see whether its score (which is 1.1)*K (which is 4) is less than the lowest score in NBest (which is 0). Since this is not true, it is added to the dictionary CurScores, i.e., CurScores contains (7,1.1). It is also added to NBest so that NBest will also contain (7,1.1). The P1 is then moved to point to the second item in F[1] (i.e., top becomes (5, 0.9)). Since none of the features are empty, K is unchanged. Since K is not 0 (i.e., at least one feature is not empty), the process is continued.

Now, the top score of the features is from P2 (which is (5, 1.0)). Again, the listing with lid=5 is not in CurScores, and it is not true that the score (which is 1.0)*k (which is 4) is less than the lowest score of the NBest list (which is still 0). Thus, it is added to CurScores. The CurScores now contains (7, 1.1) and (5, 1.0). The NBest list also contains (7, 1.1) and (5, 1.0). P2 is adjusted to the second item of F[2] (i.e., points to (9, 0.8)). K is still unchanged.

The next top score is from P1 again (which is (17, 0,9)). For the same reason, it is added to CurScores since 0.9*4<1.0 is false. Now, CurScores becomes (7, 1.1), (5, 1.0), and (17, 0.9). However, NBest is unchanged since 0.9 is less than 1.0. P1 is moved to the third item (which is (5, 0.9)).

next, the top score is still from P1 (which is (5, 0.9)). Since lid 5 is already in the CurScores, the score currently stored (5, 1.0) is obtained and the new score 0.9 is added to it. It is stored back. Now, CurScores contains (7, 1.1), (5, 1.9), and (17, 0.9). The NBest now becomes (5, 1.9) and (7, 1.1). At this moment, FC(fid=5) has the highest score. P1 points to the next item which is (9, 0.8). K is unchanged.

In the next step, the top score is from P1 (which is (9, 0.8)). Since it is not in CurScores, and 0.8*4<1.1 is false, we add it to CurScores, which contains (7, 1.1), (5, 1.9), (17, 0.9), and (9, 0.8). The NBest list and K are unchanged. P1 moves to the next item, which assumedly has a lower score.

In the next step, the top score is from P2 (which is (9, 0.8)). Since lid 9 is in the CurScores, the scores are added. CurScores then has (7, 1.1), (5, 1.9), (17, 0.9), and (9, 1.8). The NBest is updated to be (5, 1.9) and (9, 1.8). K is unchanged.

In the next step, the top score is from P2 again (which is (12, 0.7)). Since it is not in CurScores and 0.7*4>1.8 is false, it is added to CurScores (which now contains (7, 1.1), (5, 1.9), (17, 0.9), (9, 1.8), and (12, 0.7)). NBest is unchanged. P2 is moved to the next item, which is empty. Since P2 is empty, K is decreased by 1 and becomes 3.

Since K=3>0, the process should be continued. The next top score is from P3 (41, 0.4). The lid 41 is not in CurScores. However, since 0.4*3<1.8 is ture, we discard it (i.e., we do not add it to CurScores and do not update NBest). P3 moves to the next item, which is (9, 0.3).

The process is continued until K=0. In the end, the final NBest will be (9, 2.2) and (5, 1.9). Thus, the best matched listing is "Ficus Alumni Association" and the second best is "Ficus Corporation" given the utterance of "Ficus Alumni Association" and the known static rankings. As this example illustrates, the described algorithm and indexing file enable an NBest determination to be made without computing a score for every listing in index 112.

Figure 5:
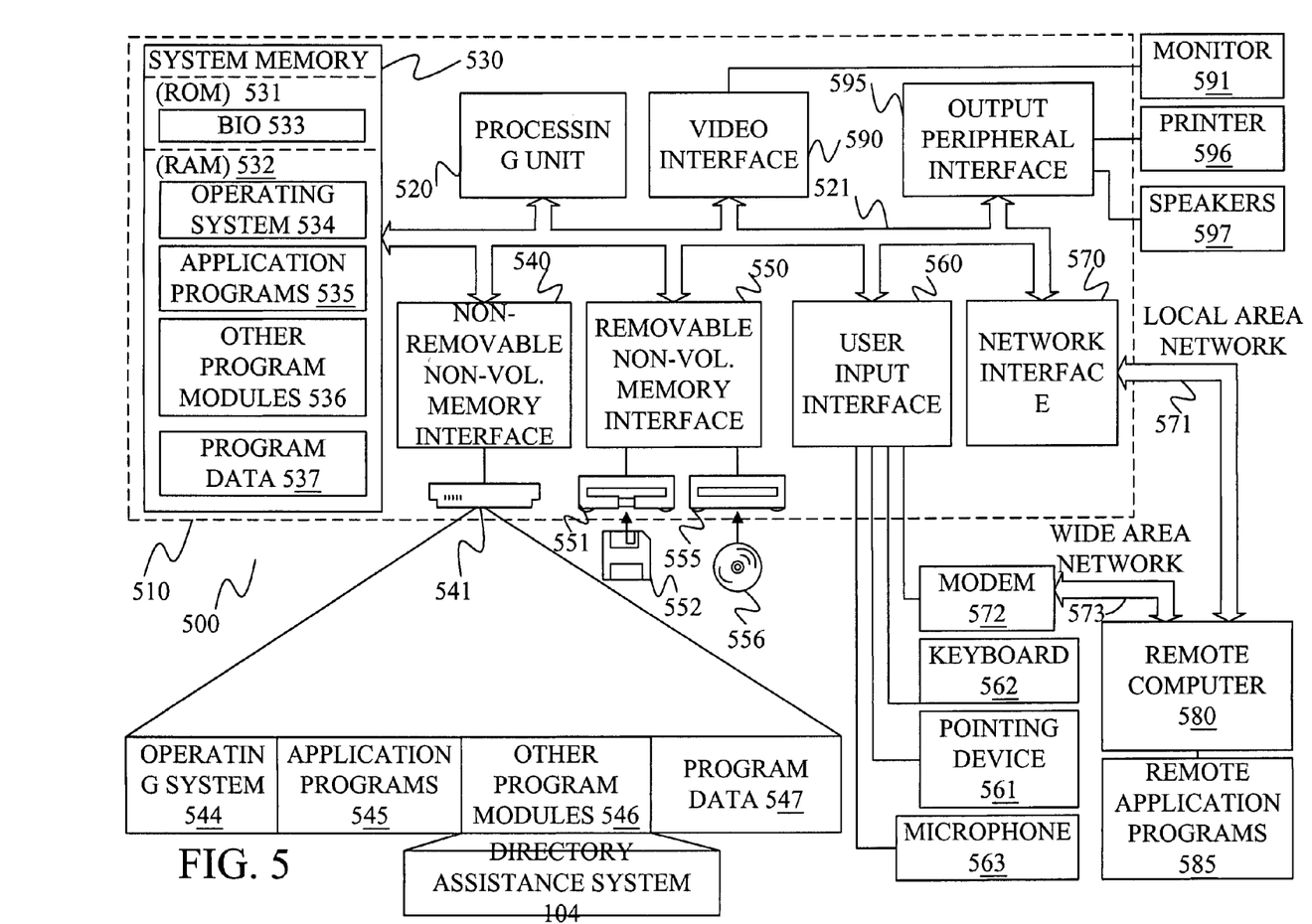
FIG. 5 illustrates an example of a suitable computing system environment in which embodiments may be implemented.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives, and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. It can be seen that FIG. 5 shows directory assistance system 104 residing in other applications 546. Of course, it will be appreciated that system 104 can reside in other places as well, including in the remote computer, or at any other location that is desired.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing an output indicative of an evaluation of a strength of association of a query relative to a collection of listings stored in an index, the method comprising:
    utilizing a computer processor that is a functional component of the computer, to generate an indexing file that contains a listing of individual features of the listings in the index, wherein each individual feature in said listing is represented in the indexing file by a unique feature identifier such that each individual feature in said listing is uniquely identified,
    wherein generating the indexing file such that the indexing file includes, for each of the individual features in said listing, a set of score that represent strengths of correlation between the individual feature and each listing in the index;
    utilizing the indexing file as a basis for creating a ranking of the listings in the index, the ranking being prioritized based on a degree of strength of association with the query;
    identifying a sub-set of listings in the index that as determined by the ranking and a degree of strength of association relative to the query;
    providing listings in the index that are likely correspond to the query;
    at least one particular listing in the index is excluded from being a comparison of features in the query with features in the one particular listing;
    identifying a plurality of query features associated with the query;
    assigning one of said unique query identifiers to each of the plurality of query features;
    cross referencing, into the indexing file, the unique query identifiers assigned to each of the plurality of query features; and
    creating a ranking that factors a set of scores included in the indexing file with the cross referenced unique query identifiers.

2. The method of claim 1, wherein generating an indexing file comprises generating the indexing file such that the indexing file also contains for each of the individual features in said listing, a listing identifier and a score, the listing identifier being directly indicative of a particular listing in said collection of listings.

3. The method of claim 1, wherein said step of creating a ranking further comprises creating a ranking of listings in the index further comprises creating the ranking through a computation that factors in said score for the individual features in said listing.

4. The method of claim 1, wherein generating an indexing file that contains a listing of individual features of the listings in the index further comprises generating the indexing file such that the indexing file includes, for each of the individual features in said listing, a set of score that represent strengths of correlation between the individual feature and each listing in the index.

5. A computer implemented method for generating an index file for supporting a directory assistance service, the method comprising:
    utilizing a computer processor that is a functional component of the computer to generate an indexing file that contains a first collection of pairs for a first uniquely identified listing feature, wherein first collection of pairs includes a first pair consisting of a listing identifier and a first score, the first score being indicative of a degree of strength with which a first listing identified by the first listing identifier includes characteristics that are consistent with the first uniquely identified listing feature, wherein generating the index file such that the first collection pairs also includes a second pair consisting of a second listing identifier and a second score, the second score being indicative of a degree of strength with which a second listing identified by the second listing identifier includes characteristics that are consistent with the first uniquely identified listing feature, wherein the first collection of pair includes a separate and distinct pair for every listing in the index that includes the listing feature, each separate and distinct pair including a listing identifier and a score, and wherein all of the separate and distinct pairs in the first collection of pairs are listed, within the indexing file, in an order that is at least partially contingent upon an evaluation of a value of the score in each separate and distinct pair;

wherein generating the indexing file such that the indexing file includes, for each of the individual features in said listing, a set of score that represent a degree of strengths of correlation between the individual feature and each listing in the index;

identifying a plurality of query features associated by the query;

assigning one of said unique query identifiers to each of the plurality of query features;

cross referencing, into the indexing file, the unique query identifiers assigned to each of the plurality of query features; and creating a ranking that factors a set of scores included in the indexing file with the cross referenced unique query identifiers.

6. The indexing file of claim 5, wherein the first collection of pairs does not include a listing identifier that identifies a listing that does not include characteristics that are consistent with the first uniquely identified listing feature.

7. The indexing file of claim 5, wherein the indexing file includes, in addition to said first and second pair, other pairs each consisting of a listing identifier of a listing and a score indicative of a degree of strength with which that listing includes characteristics that are consistent with the first uniquely identified listing feature, and wherein the first, second and other pairs are organized, within the indexing file, in descending or ascending order based on said score included in each pair.

8. The indexing file of claim 5, wherein the first uniquely identified listing feature is a category.

9. The indexing file of claim 5, wherein the first, second and at least one other pair are organized, within the indexing file, in an order determined based on the score included within each pair.

10. The indexing file of claim 5, wherein the first uniquely identified listing feature is a cross-reference to a listing in an index that includes the listing feature.

11. A Computer-implemented method for providing a directory assistance service, the method comprising:

identifying a first feature associated with a query;

determining a feature identifier associated with the first feature;

locating a first collection of listing identifiers, wherein each listing identifier in the first collection identifies a listing, in an index of listings and includes the first feature;

identifying a second feature associated with a query;

determining a feature identifier associated with the second feature;

locating a second collection of listing identifiers, wherein each listing identifier in the second collection identifies a listing, in the index of listings and includes the second feature;

utilizing a computer processor that is a functional component of the computer to rank at least some of the listings in the index based at least in part on the listing identifiers in the first and second collection, and based at least in part on a score associated with each listing identifier in the first and second collection;

providing the directory assistance service based at least in part on the ranking, an output indicative of listings in the index that are likely correspond to the query;

excluding from the output at least one listing associated with a listing identifier included in one of the first and second collections of listing identifiers based at least in part on calculation of a numeric score;

identifying a plurality of query features associated by the query;

assigning one of said unique query identifiers to each of the plurality of query features;

cross referencing, into the indexing file, the unique query identifiers assigned to each of the plurality of query features; and creating a ranking that factors a set of scores included in the indexing file with the cross referenced unique query identifiers.

12. The method of claim 11, wherein identifying a first feature comprises identifying a particular word.

13. The method of claim 11, wherein identifying a first feature comprises identifying a feature other than a particular word or set of words.

* * * * *